United States Patent [19]

Avenel

[11] 4,312,644
[45] Jan. 26, 1982

[54] GAS SEPARATOR FOR LIQUID DISPENSING DEVICE

[75] Inventor: René Avenel, Vincennes, France

[73] Assignee: Constructions Mecaniques Pernin Sarl, Montreuil sous Bois, France

[21] Appl. No.: 142,892

[22] Filed: Apr. 23, 1980

[30] Foreign Application Priority Data

May 4, 1979 [FR] France .................................. 79 11240
Dec. 21, 1979 [FR] France .................................. 79 31390

[51] Int. Cl.³ ............................................. B01D 19/00
[52] U.S. Cl. ........................................ 55/168; 55/170
[58] Field of Search ................................. 55/164–170; 210/110, 120, 123

[56] References Cited

U.S. PATENT DOCUMENTS

| | | | |
|---|---|---|---|
| 2,878,889 | 3/1959 | Gilbert | 55/170 X |
| 2,997,053 | 8/1961 | Walker et al. | 55/168 X |
| 3,344,587 | 10/1967 | Wakeman | 55/170 |
| 3,362,337 | 1/1968 | Gilman | 55/170 X |
| 3,867,071 | 2/1975 | Hartley | 55/170 X |

FOREIGN PATENT DOCUMENTS 1544125 9/1970 Fed. Rep. of Germany ........ 55/170

Primary Examiner—Robert H. Spitzer
Attorney, Agent, or Firm—Young & Thompson

[57] ABSTRACT

A gas separator for stopping a flow of liquid in a liquid dispensing device when the liquid contains excess gas and for permitting the purging of this excess gas, the gas separator comprising a tank through which the liquid flows, and a cylindrical float disposed in the tank and adapted to actuate liquid flow stop control means which will actuate means for stopping the flow of liquid, the float being surrounded with slight peripheral play by a housing disposed at the top of the tank and being reciprocable between an upper position, when no excess gas is present, and a lower position, when excess gas is present, said stop control means and a duct for purging excess gas being disposed at the top of the tank in the vicinity of said housing.

20 Claims, 7 Drawing Figures

GAS SEPARATOR FOR LIQUID DISPENSING DEVICE

FIELD OF THE INVENTION

The present invention relates to a gas separator, particularly for use in devices for dispensing liquids, in which dispensing has to be stopped when the liquid contains excess gas.

DESCRIPTION OF PRIOR ART

To prevent a liquid containing excess gas being dispensed, it is usual to interpose a gas separating apparatus in the dispensing circuit, particularly upstream of a meter. Such gas separating apparatus usually comprises a tank in which the gas is allowed to separate from the liquid and ascends to the upper regions of the tank, and means for detecting excess gas, such as a capacitive probe or a float, which permits the dispensing of liquid to be stopped when excess gas is present.

Known devices of this type suffer from the drawback of being very costly or of exhibiting considerable delay in coming into operation which is not suitable for low rates of flow.

BRIEF SUMMARY OF THE INVENTION

An object of the present invention is to provide a gas separator for a liquid dispensing device which will separate gas from a liquid in permanent and automatic manner up to a certain limit beyond which the flow of liquid through the apparatus is stopped by the actuation of a liquid flow stop control, said apparatus being free from the drawbacks referred to above, while being of more economical and more convenient construction, and with very sensitive operation.

According to the present invention there is provided a gas separator for stopping a flow of liquid in a liquid a dispensing device when the liquid contains excess gas and for permitting the purging of this excess gas, the gas separator comprising a tank through which the liquid flows, and a cylindrical float disposed in the tank and adapted to actuate liquid flow stop control means which will actuate means for stopping the flow of liquid, the float being surrounded with slight peripheral play by a housing disposed at the top of the tank and being reciprocable between an upper position, when no excess gas is present, and a lower position, when excess gas is present, said stop control means and a duct for purging excess gas being disposed at the top of the tank in the vicinity of said housing.

As a result of this arrangement the float is very sensitive and enables the stop control means to be actuated with virtually no delay.

If desired, a horizontal deflector screen, of a cross-section intermediate between that of the tank and that of the housing, is disposed with a separating gap below said housing. In this arrangement, the float is protected from the turbulence of the liquid flow passing through the tank.

In one embodiment, the liquid flow stop control means acts upon a stop member comprising a valve disposed in a dispensing duct of the dispensing device downstream of the gas separator and of a meter.

In a preferred alternative, the liquid flow stop control means acts upon a flow interruption means placed in the said liquid dispensing device upstream of the gas separator. In this arrangement, activation of the flow interruption means is not likely to create an overpressure either in the gas separator or in the meter generally placed downstream of the gas separator.

Preferably, the flow interruption means placed in the dispensing device upstream of the gas separator is constituted by a by-pass of a pump supplying the dispensing arrangement, said by-pass being controlled as regards its opening not only by an excess pressure downstream of the pump, but also in response to the liquid flow stop control means. More particularly, the by-pass of the pump has a delivery valve which is normally held closed at a specific setting but which is allowed to open when the liquid flow stop control means is activated, whereupon the pump delivers to itself and no longer sends liquid downstream into the liquid dispensing device. In this arrangement one stop valve is done away with, which represents a saving. All that is needed is the appropriate by-pass for the pump which may be achieved with a relatively simple construction. Advantageously, the by-pass includes a membrane associated with the spring of the delivery valve of the pump by-pass. This membrane is subject either to a compressed air pressure when the stop control means is inactive, which normally closes the delivery valve, or to atmosphere when the stop control is active, which brings about the opening of the delivery valve.

BRIEF DESCRIPTION OF THE DRAWINGS

The present invention will now be described for the sake of example only, with reference to the attached drawings wherein:

In FIGS. 1 to 4 and in FIG. 5 like parts are referred to by like reference numerals, except that in FIG. 5 the numerals are followed by the letter A. Similarly in FIGS. 6 and 7 and in FIGS. 1 to 5, like parts are referred to by like reference numerals, except that in FIGS. 6 and 7 the numerals are followed by a prime.

DETAILED DESCRIPTION OF THE INVENTION

Figure 1:
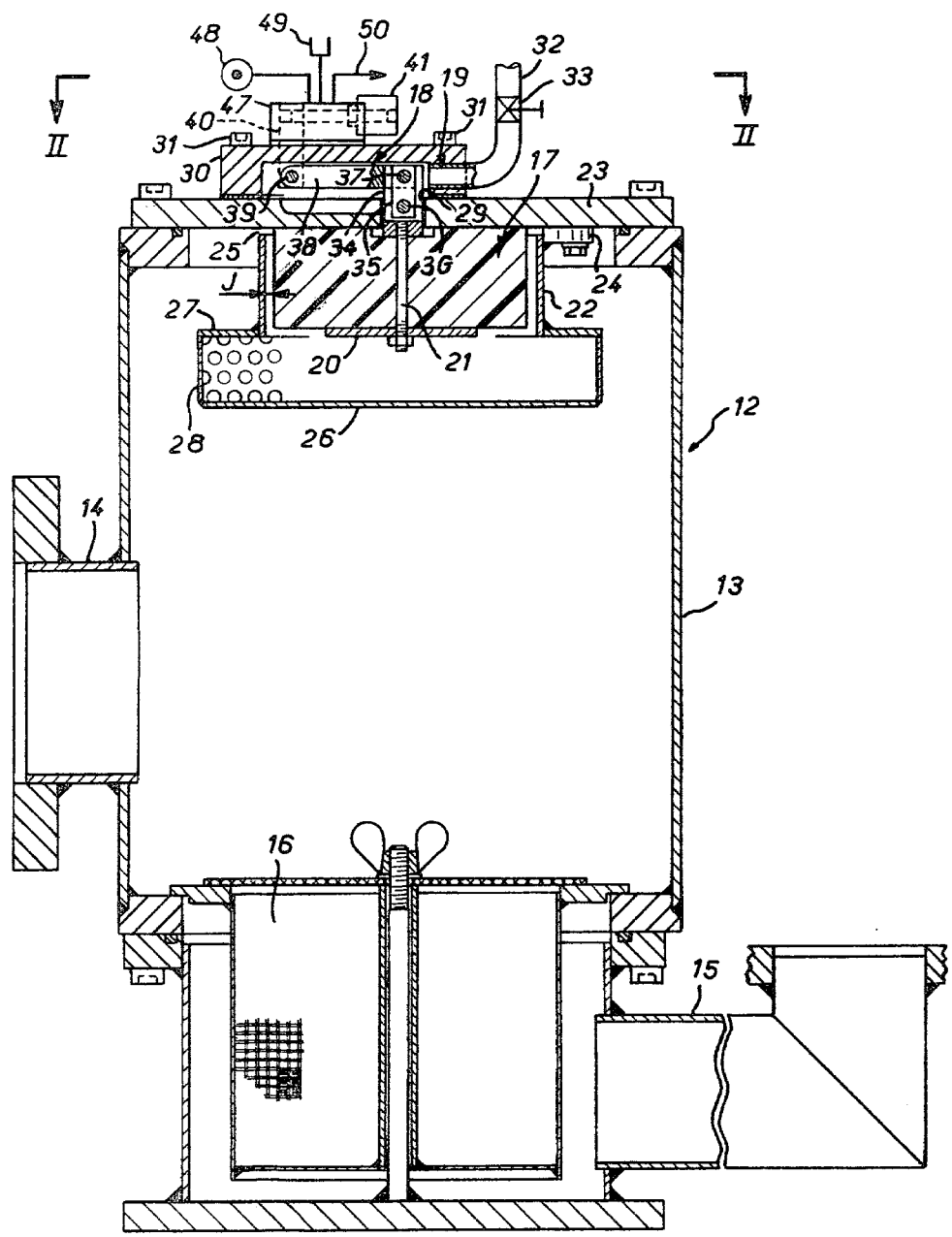
FIG. 1 is an elevation of a gas separator according to the invention, shown as a vertical section taken along line I—I of FIG. 2.
Figure 2:
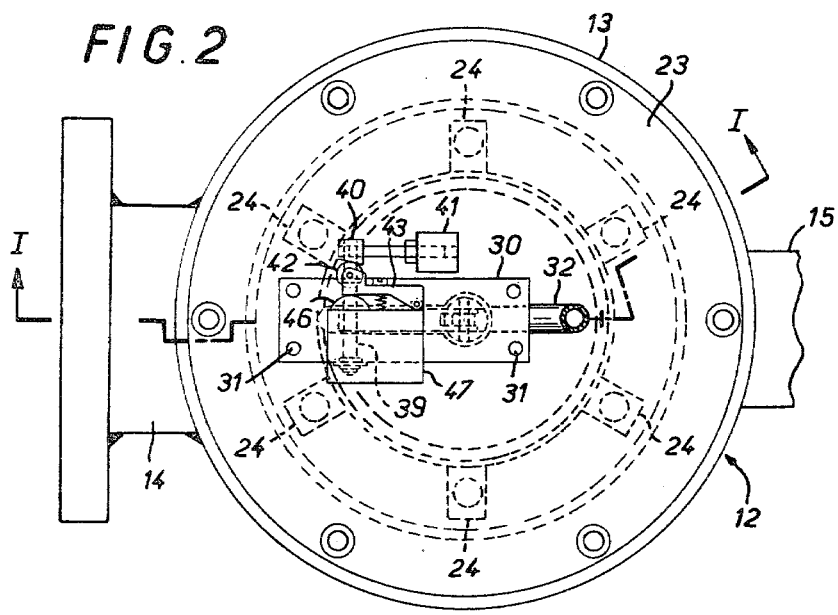
FIG. 2 is a plan of the gas separator of FIG. 1, the representation being taken along arrows II—II of FIG. 1.
Figure 3:
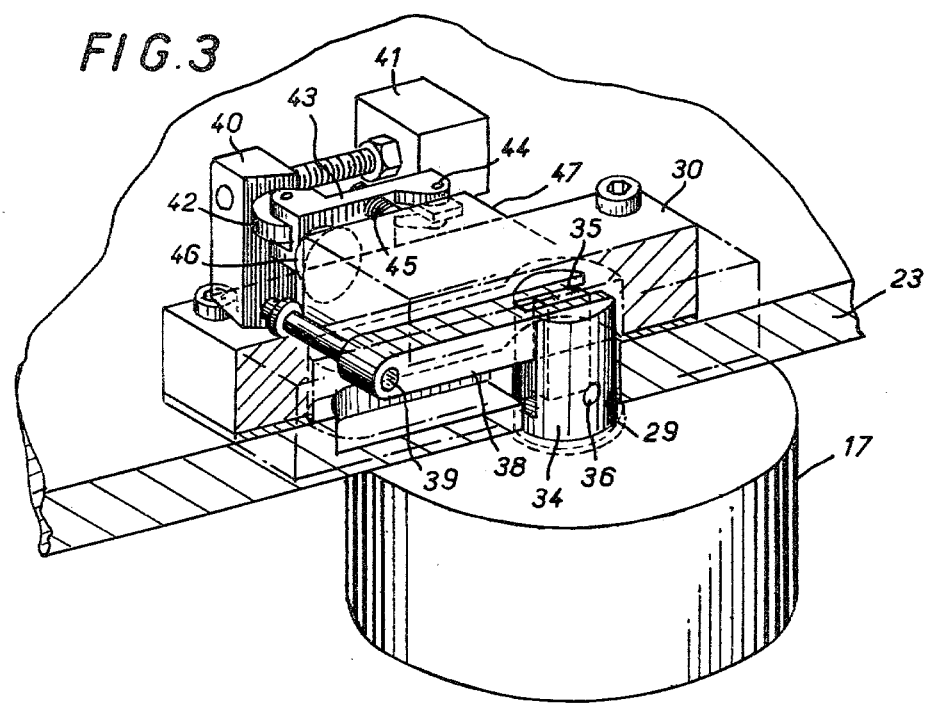
FIG. 3 is a perspective view on a larger scale of the liquid flow stop control means of the separator of FIGS. 1 and 2.

Referring first to FIGS. 1 to 4 which show, by way of example only, the use of the present invention in a device for dispensing hydrocarbons, the device comprising in the direction of flow of fluid through the device, a liquid supply duct 70, a pump 71, a duct 72 leading to an inlet 14 of a gas separator 12. An outlet 15 of the gas separator 12 is connected to a meter 10 which is followed by a stop valve 11 and then by a dispensing duct 73.

Figure 4:
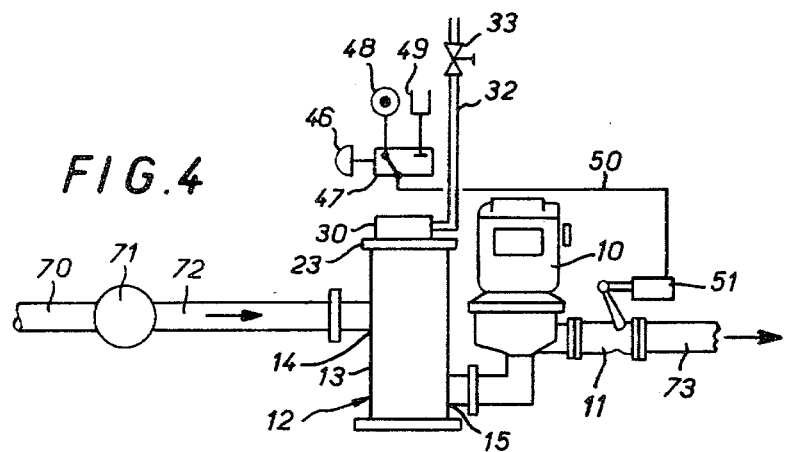
FIG. 4 is a diagram of a liquid dispensing device fitted with a gas separator according to the invention, having a manual purging arrangement.

The said gas separator 12 is disposed upstream of the meter 10 and comprises a vertical cylindrical tank 13 (as shown in FIGS. 1 and 4) which has an inlet 14 for liquid disposed approximately half way up the side of the tank and an outlet 15 for liquid at the bottom of the tank. A filter 16 is interposed between the inlet 14 and the outlet 15.

A float 17, a liquid stop control 18 which activates the valve 11, and a passage 19 for purging excess gas (FIG. 1) are grouped at the top of the tank 13 in coaxial manner with the latter.

The float 17 is cylindrical and is of light material such as cellular plastic. A metal plate 20 fixed under the float 17 by a shaft 21 which is solid with the latter and forms part of the stop control 18 acts as a ballast which enables the sensitivity of the float to be adjusted.

The float 17 is movable within a housing 22 between an upper position (represented in FIG. 1) bearing against the top wall 23 of the tank 13 in the absence of excess gas, and a lower position away from the top wall 23 in the presence of excess gas. The float 17 fits within the housing 22 with slight peripheral play J, making the float 17 very sensitive to the presence of gas at the top of the tank 13.

The housing 22 is defined by a cylindrical crown of smaller cross-section than the tank 13 and is fixed to the top wall 23 (FIGS. 1 and 2) by a set of feet 24 disposed about the circumference of the crown in such a way as to leave passages 25 between adjacent feet at the top end of the crown 22. Alternatively, these passages may be done away with and the feet 24 replaced by a circular flange.

A horizontal deflector screen 26 having a cross-section intermediate between that of tank 13 and that of crown 22 is disposed at a little distance below the crown 22 and is supported by the latter by means of an annular shoulder 27 and a cylindrical basket 28. The crown 22, the shoulder 27 and the basket 28 thus form a unit fixed at 24 to the top wall 23 of the tank. This unit shields the float 17 from the turbulence caused by the liquid passing through the tank 13.

The gas purging passage 19 includes a central orifice 29 made in the top wall 23 of the tank 13, a box 30 fixed at 31 to top wall 23 and surrounding the said orifice 29, and a duct 32 connected to box 30 and provided with a valve 33.

The stop control (FIGS. 1 to 3) comprises a cylindrical rod 34 integral with the shaft 21 and passing through the hole 29 with some play. A connecting link 35 is hinged at 36 on the rod 34 and at 37 on a lever 38. The latter is fixed to a shaft 39 pivotably mounted on the box 30. It will be seen from the drawings that the connecting rod 35 and lever 38 are housed within the box 30. The shaft 39 passes through the side of the box in a fluid-tight manner and carries a cam 40 provided with a counterweight 41. The position of the counterweight 41 is adjustable to allow the sensitivity of the float 17 to be adjusted.

Cam 40 cooperates with a follower roller 42 mounted on a lever 43 pivotably mounted at 44. Lever 43, returned by a spring 45, cooperates with a pusher 46 operating a pneumatic valve 47 mounted outside the box 30. Pneumatic valve 47 (FIGS. 1 and 4) is associated with a source of compressed air 48, to a vent 49 and with a duct 50 which operates a pneumatic actuator 51 controlling the operation of the stop valve 11.

Pneumatic valve 47 is set between an open position of the valve 11 corresponding to the upper position of the float 17 where it dispatches compressed air from the source 48 into the actuator 51 and a closed position of the valve 11 corresponding to the lower position of the float 17 where it connects the actuator 51 to the atmosphere at 49.

In use of the device, liquid enters the tank 13 at inlet 14 and flows down, passes through the filter 16, and leaves the tank at outlet 15.

In the absence of gas the liquid fills up the entire volume of tank 13. The float 17 is then in contact with the top wall 23 of the tank. The arrangement is such that at this time the pneumatic valve 47 is in a position corresponding to the open position of valve 11, which permits normal dispensing of the liquid.

As the liquid passes through tank 13, which has a greater cross-section than inlet 14 and outlet 15, the liquid slows down. If the liquid contains gas, the descending time for the liquid 14 to 15 is longer than the reascending time of the gas bubbles and these collect at the top of the tank 13 forming a gas pocket.

The float 17 with its ballast 20 is subject to a thrust slightly greater than its weight, so that it has extreme sensitivity relative to the flotation level and reacts to a very small height of the gas pocket.

As soon as the height of the gas pocket increases, the level of liquid in the tank becomes lower, bringing down the float which, through the action of the connecting-rod system 34, 38 and the rotation of the shaft 39, brings about the venting of atmosphere at 49 of the valve 47 and the closing of the valve 11.

To reset the device to the operative state, gas-free liquid is made to flow into the tank 13. For example, in the case of a road tanker, the ducting of the compartment which has just been emptied is closed, and the ducting of a full compartment is opened. The gas pocket in tank 13 is evacuated by the manual opening of the valve 33 in the purging duct 32.

Figure 5:
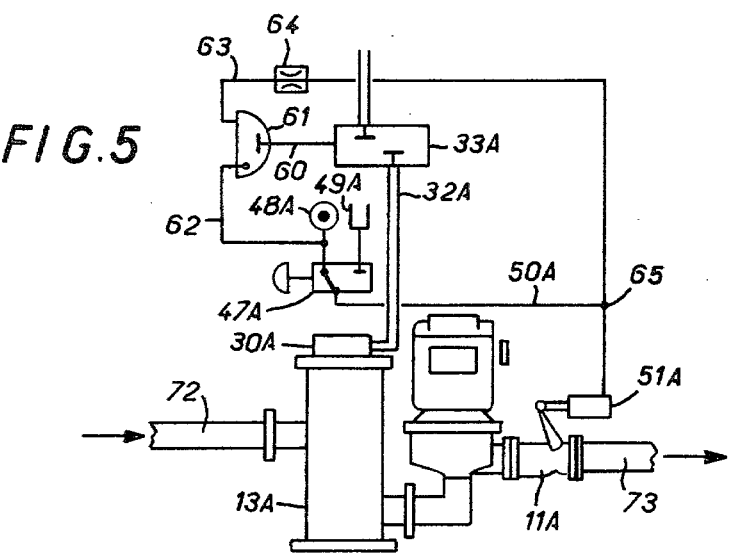
FIG. 5 is a dispensing device similar to that of FIG. 4, but with an automatic purging arrangement.

Referring now to FIG. 5, there is shown a device similar to that which has just been described with reference to FIGS. 1 to 4 but where the opening of the valve 33A in the duct for purging gas is automatic. In this embodiment the purge valve 33A is pneumatically controlled by a duct 60 connected to a cell 61. Valve 33A, normally closed, opens in response to a pressurisation of the duct 60. Cell 61 is connected by a duct 62 to the source of compressed air 48A. Cell 61 is pneumatically controlled by a duct 63 with a flow regulator 64 and connected at 65 to the duct 50A of valve 47A. Cell 61, normally closed, places ducts 60 and 62 in communication in response to a venting to atmosphere of duct 63.

In the presence of gas at the top of the tank 13A, valve 47A actuated by the descending movement of the float brings about venting to atmosphere at 49A, which causes the pneumatic actuator 51A to close valve 11A and also causes venting to atmosphere of duct 63 controlling cell 61. Duct 60 is then placed in communication with the duct 62 and the source of compressed air 48A and valve 33A opens.

The gas pocket at the top of tank 13 is thus released and the float in tank 13A rises again. This causes valve 47A to dispense compressed air to the actuator 51A of valve 11A which opens and to duct 63 of cell 61, wich brings about the closing of valve 33A.

Figure 6:
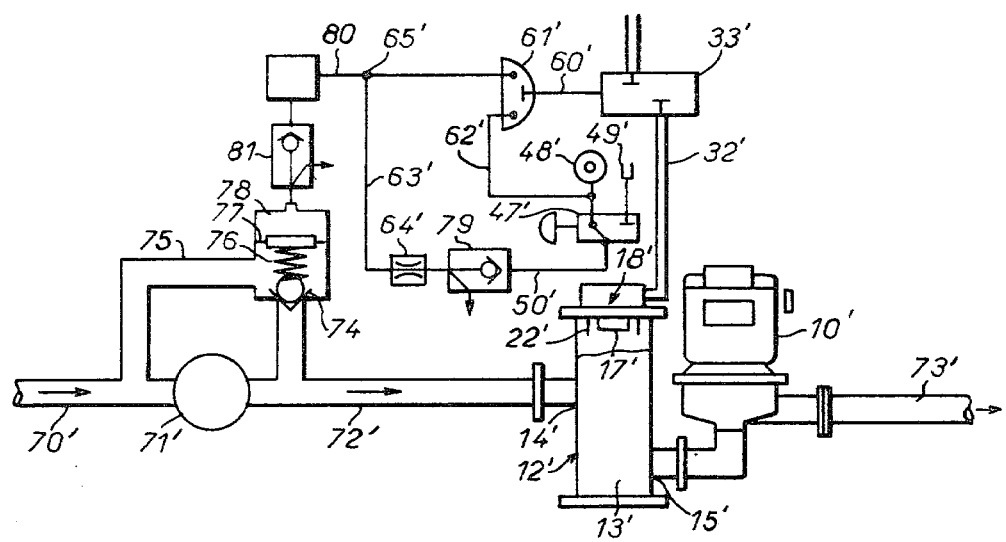
FIG. 6 is a diagram of another similar liquid dispensing device fitted with a gas separator in accordance with the present invention having a flow interruption means constituted by a pump by-pass.

In the embodiments shown in FIGS. 1 to 4 and in FIG. 5, the stop control 18 acts upon the valve 11 disposed downstream of the meter 10. In the alternative embodiment shown in FIGS. 6 and 7 this valve is done away with and instead a stop control means 18' acts upon a by-pass 74–75 of the pump 71' in such a way that, when the control stop 18' is active, the by-pass of pump 71' opens and the pump delivers to itself, which stops the flow at 72', 12' and 73'.

Figure 7:
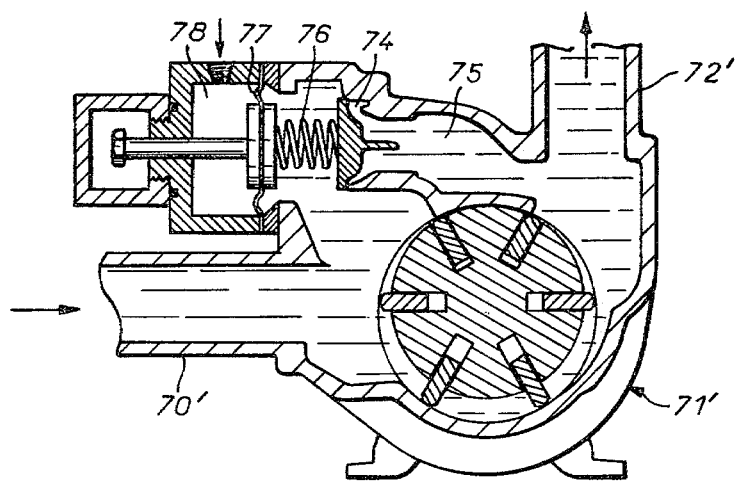
FIG. 7 is a cross-section of the pump of FIG. 6 and its by-pass slaved to the liquid flow stop control means.

Reference will be made more particularly to FIG. 7 showing a by-pass 74–75 which has a delivery valve 74 which is disposed in a duct 75 short-circuiting ducts 70' and 72'. Delivery valve 74 has a calibrated spring 76 which, instead of having a fixed support, is applied against a membrane 77 defining a control chamber 78. Said control chamber 78 is adapted to be pressurised by compressed air when operation is normal, that is to say in the absence of excess gas in the separator 12', but it can also be vented to atmosphere when there is excess gas in the purging device 12'.

When chamber 78 is pressurised, membrane 77 occupies a forward position such as represented in FIG. 7 where it gives spring 76 a setting such that valve 74 is normally closed and opens only in the event of undesirable excess pressure in duct 72'.

When chamber 78 is vented to atmosphere, membrane 77 is allowed to move back under the action of spring 76 which is released, which brings about the opening of valve 74. Then, pump 71' delivers to itself, which stops the flow of liquid into duct 72'.

The slaving of chamber 78 to the stop control 18' is similar to that which was described with reference to FIG. 5 for the slaving of stop valve 11 from the stop control 18.

Referring again to FIG. 6, in the embodiment valve 33' is controlled by a cell 61' connected by a duct 62' to a source of compressed air 48'. Cell 61' is controlled pneumatically by a duct 63' having a flow regulator 64' and a non-return valve 79 and connected to a duct 50' of a valve 47'. Cell 61' which is normally closed places duct 62' is communication with a duct 60' in response to a venting to atmosphere at 49' of duct 63'. The duct 60' pneumatically controls a purging valve 33' placed on the purge duct 32'.

As in FIG. 5, duct 63' is connected at 65' to a duct, here denoted by 80, for controlling the flow stop member in response to stop control 18'. Duct 80 has a non-return valve 81 and is connected to the control chamber 78 of membrane 77.

In the absence of gas in gas separator 12', the liquid fills up the entire volume of the tank 13'. The float 17' is in high position and the pneumatic valve 47' is in a position such that the control chamber 78 of the delivery valve 74 is pressurised. The delivery valve 74 is therefore closed and pump 71' delivers normally into duct 72'.

In the presence of gas at the top of tank 13', valve 47' controlled by the lowering of the float 17' brings about the venting to atmosphere of the control chamber 78 of the delivery valve 74 of pump 71. Pump 71' delivers to itself and no longer supplies duct 72'.

At the same time valve 47' brings about the communication of duct 60' with the duct 62' and with the source of compressed air 48' and causes valve 33' to open. The gas pocket at the top of the tank 13' is thus released, whereupon float 17' rises again. Valve 47' then dispenses compressed air to the chamber 78 of the delivery valve 74 which closes again, and to the duct 63' of cell 61', which brings about the closure of valve 33'. Normal operation of the dispensing device is thus resumed.

What is claimed is:

1. A gas separator adapted to stop a flow of liquid in a liquid dispensing device when the liquid contains excess gas, and adapted to permit the purging of said excess gas, the gas separator comprising a tank through which the liquid flows, and a cylindrical float disposed in the tank and adapted to actuate liquid flow stop control means for actuating means for stopping the flow of liquid, the float being surrounded with slight peripheral play by a housing disposed at the top of the tank and being reciprocable between an upper position, when no excess gas is present, and a lower position, when excess gas is present, said stop control means and a duct for purging excess gas being disposed at the top of the tank in the vicinity of said housing, the stop control means and the duct for purging excess gas passing through the top wall of the tank in an area within the periphery of the float housing, the duct for purging excess gas including an orifice in the top wall of the tank, a box fixed to said wall and surrounding said orifice, and duct connected to said wall and fitted with a valve, the stop control means including a shaft attached to the float and passng through said orifice and a connecting rod system extending into said box and actuating a control valve mounted outside said box.

2. A gas separator according to claim 1, wherein the stop control means extends at least partly into the duct for purging excess gas.

3. A gas separator according to claim 1, wherein said connecting rod system actuates said valve by means of a cam.

4. A gas separator according to claim 1, wherein said valve actuates a liquid flow stop valve.

5. A gas separator according to claim 1, wherein said valve actuates both a liquid flow stop valve and a valve on the duct for purging excess gas.

6. A gas separator according to claim 1, wherein said valve is pneumatic.

7. A gas separator according to claim 1, wherein the top position of the float is defined by the float abutting against the top wall of the tank.

8. A gas separator according to claim 1, wherein a ballast member is fixed under the float.

9. A gas separator according to claim 8, wherein said ballast member is fixed under the float by means of a shaft attached to the float and which forms part of the stop control means.

10. A gas separator according to claim 1, wherein the housing which surrounds the float at the top of the tank is defined by a cylindrical crown of smaller section than the tank.

11. A gas separator according to claim 10, wherein said crown has passages at its top end.

12. A gas separator according to claim 1, wherein the float and the duct for purging excess gas are coaxial with the tank.

13. A gas separator according to claim 1, wherein the tank has an inlet for liquid positioned half-way up a side wall thereof and an outlet for liquid positioned at the bottom of the tank.

14. A gas separator according to claim 13, wherein a filter is interposed between the liquid inlet and outlet.

15. A gas separator according to claim 1, wherein said liquid flow stop control means acts upon a flow-interruption means placed in said liquid dispensing device, upstream of the gas separator.

16. A gas separator according to claim 15, wherein said flow interruption means is constituted by a by-pass of a pump supplying the dispensing device, the opening of the by-pass being controlled not only by an excess pressure downstream of the pump, but also in response to the liquid flow stop control means.

17. A gas separator according to claim 16, wherein the by-pass of the pump comprises a delivery valve which is normally held closed at a specific setting but is allowed to open when the liquid flow stop control means is actuated.

18. A gas separator according to claim 17, wherein a membrane is associated with the spring of the delivery valve of the pump by-pass, said membrane being subjected either to a compressed air pressure when the stop control is inactive, which normally closes the delivery valve, or to the atmosphere when the stop control is actuated, which gives rise to the opening of the delivery valve.

19. A gas separator adapted to stop a flow of liquid in a liquid dispensing device when the liquid contains excess gas, and adapted to permit the purging of said excess gas, the gas separator comprising a tank through which the liquid flows, and a cylindrical float disposed in the tank and adapted to actuate liquid flow stop control means for actuating means for stopping the flow of liquid, the float being surrounded with slight peripheral play be a housing disposed at the top of the tank and being reciprocable between an upper position, when no excess gas is present, and a lower position, when excess gas is present, said stop control means and a duct for purging excess gas being disposed at the top of the tank in the vicinity of said housing, the housing which surrounds the float at the top of the tank being defined by a cylindrical crown of smaller section than the tank, and a horizontal deflector screen having a cross section intermediate that of the tank and that of the crown disposed at a chosen distance below said crown.

20. A gas separator according to claim 19, wherein said crown supports said screen by means of an annular shoulder and a cylindrical basket to form a unit fixed to the upper part of the tank.

* * * * *